US012711081B2

(12) United States Patent
Catalano et al.

(10) Patent No.: US 12,711,081 B2
(45) Date of Patent: Aug. 18, 2026

(54) DYNAMICALLY ROUTING INPUT/OUTPUT COMMANDS

(71) Applicant: INTERNATIONAL BUSINESS MACHINES CORPORATION, Armonk, NY (US)

(72) Inventors: Pasquale A. Catalano, Wallkill, NY (US); John S. Werner, Fishkill, NY (US); Arkadiy O. Tsfasman, Wappingers Falls, NY (US); Andrew Gerald Crimmins, Montrose, NY (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 18/630,208

(22) Filed: Apr. 9, 2024

(65) Prior Publication Data

US 2025/0315392 A1 Oct. 9, 2025

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ............................ G06F 13/20; G06F 2213/40
USPC ............................. 710/5, 15, 31, 33, 36, 62
See application file for complete search history.

(56) References Cited

U.S. PATENT DOCUMENTS 4,751,167 A * 6/1988 Yamagata ................. G03F 1/80 430/281.1
5,790,529 A * 8/1998 Haber ................ H04B 7/18571 370/328
8,155,518 B2 * 4/2012 Young .................. H04L 47/125 370/231
8,332,860 B1 * 12/2012 Yahalom ............ H04L 67/1097 718/104
9,143,819 B2 * 9/2015 Ramakrishnan ... H04N 21/4436
10,841,427 B1 11/2020 Lahav et al.
11,368,589 B2 6/2022 Lahav et al.
11,831,624 B2 11/2023 Verzun et al.
2012/0246214 A1 * 9/2012 Ogawa .................. G06F 9/5094 709/201
2012/0316689 A1 * 12/2012 Boardman .......... H02J 13/1337 700/297
2013/0182575 A1 * 7/2013 McLean ................ H04L 47/122 370/237
2018/0167825 A1 * 6/2018 Egner .................. H04W 16/16

OTHER PUBLICATIONS

Anonymous, A Method and System for Optimal Routing of Input/Output Data for Business Intelligence Queries, an IP.com Prior Art Database Technical Disclosure, IP.com No. IPCOM000240794D, IP.com Electronic Publication Date: Mar. 3, 2015, 4 pages.

(Continued)

*Primary Examiner* — Idriss N Alrobaye
*Assistant Examiner* — Henry W Yu
(74) *Attorney, Agent, or Firm* — Onyx IP Group

(57) ABSTRACT

Methods, systems, and products for dynamically routing I/O commands includes receiving an input/output (I/O) command targeting a destination target, selecting, from a plurality of paths to the destination target, a path based on power consumption and a command response time associated with the path, and processing the I/O command on the selected path.

20 Claims, 4 Drawing Sheets

(56) References Cited

OTHER PUBLICATIONS

Anonymous, Method and System for Managing Power Consumption of Data Centers, an IP.com Prior Art Database Technical Disclosure, IP.com No. IPCOM000191680D, Original Publication Date: Jan. 11, 2010, IP.com Electronic Publication Date: Jan. 11, 2010, 5 pages.

Anonymous, Power optimization methodology for combinational logic, an IP.com Prior Art Database Technical Disclosure, IP.com No. IPCOM000248356D, IP.com Electronic Publication Date: Nov. 17, 2016, 7 pages.

Anonymous, Seamless Aggregation Member Link Transitioning To Reduce Power Consumption in Link Aggregation of IEEE802.3AZ Based Links, an IP.com Prior Art Database Technical Disclosure, IP.com No. IPCOM000251429D, IP.com Electronic Publication Date: Oct. 31, 2017, 14 pages.

Cai et al., Dynamic Routing Networks, IEEE, 2021 IEEE Winter Conference on Applications of Computer Vision (WACV), DOI: 10.1109/WVACV48630.2021.00363, Date Added to IEEE Xplore: Jun. 14, 2021, 10 pages.

Pirkko Aulin-Ahmavaara, Dynamic input-output and capital, Paper prepared for the Thirteenth International Conference in Input-Output Techniques, Macerata, Italy, https://www.iioa.org/conferences/13th/files/AulinAhmavaara_DynamicIO&Capital.pdf, dated 2020, printed Feb. 7, 2024, 11 pages.

Uehara et al., Fully Dynamic Input-Output/System Dynamics Modeling for Ecological-Economic System Analysis, MDPI, Sustainability 2018, 10(6), 1765, doi: 10.3390/su10061765, Published May 29, 2018, 22 pages.

* cited by examiner

DYNAMICALLY ROUTING INPUT/OUTPUT COMMANDS

BACKGROUND

Field of the Disclosure

The field of the disclosure is data processing, or, more specifically, methods, systems, and products for dynamically routing input/output (I/O) commands.

Description of Related Art

In some computing environments, there are multiple pathways for routing I/O traffic to a single I/O device or storage device. In such environments, the system must select which of the pathways to utilize for directing the traffic to the device. Conventionally, a round robin scheduling process is used to cycle through all of the pathways to a given device in order to utilize all of the pathways equally. Such an approach does not consider sustainability as a factor in selecting which path to use for a given device.

SUMMARY

Methods and systems for dynamically routing I/O commands according to various embodiments are disclosed in this specification. In accordance with one aspect of the present disclosure, a method of dynamically routing I/O commands may include receiving an input/output (I/O) command targeting a destination target, selecting, from a plurality of paths to the destination target, a path based on power consumption and a command response time associated with the path, and processing the I/O command on the selected path.

In accordance with another aspect of the present disclosure, dynamically routing I/O commands may include a computing system including: a processor, memory, and an I/O controller for controlling I/O operations from the computing system, the I/O controller configured to: receive an input/output (I/O) command targeting a destination target, select, from a plurality of paths to the destination target, a path based on power consumption and a command response time associated with the path, and process the I/O command on the selected path.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
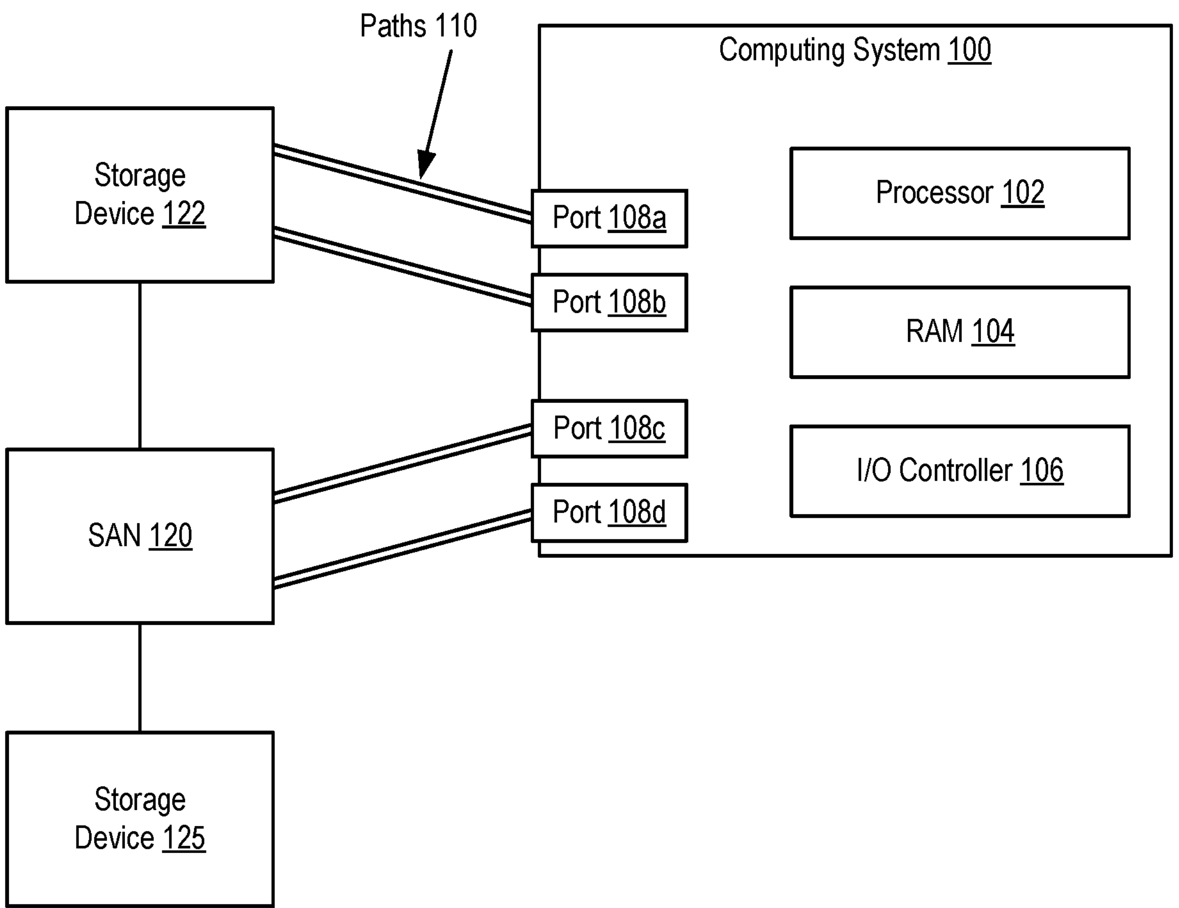
FIG. 1 shows an example line drawing of a system configured for dynamically routing I/O commands in accordance with embodiments of the present disclosure.

In accordance with one aspect of the present disclosure, a method of dynamically routing I/O commands may include receiving an input/output (I/O) command targeting a destination target, selecting, from multiple paths to the destination target, a path based on power consumption and a command response time associated with the path, and processing the I/O command on the selected path. Such an embodiment allows for increased system performance and efficiency by selecting paths with lower power consumption and faster command response times.

In another embodiment, the method of dynamically routing I/O commands also includes tracking, for multiple I/O commands and at each of the multiple paths, the power consumption and the command response time. Such an embodiment allows for increased system performance by using historical data when selecting a path.

In another embodiment, the method of dynamically routing I/O commands also includes ranking each of the multiple paths based on the tracked power consumption and the tracked command response time associated with each path. Such an embodiment allows for increased system performance and efficiency by selecting paths with lower power consumption and faster command response times.

In another embodiment, in the method of dynamically routing I/O commands, selecting the path includes selecting a highest ranked path. Such an embodiment allows for increased system performance and efficiency by selecting only the best paths when routing I/O traffic.

In another embodiment, in the method of dynamically routing I/O commands, a path of the multiple paths is not ranked if the command response time associated with the path is greater than a threshold. Such an embodiment allows for increased system performance by avoiding selecting a path that is too slow and may not meet SLA time requirements.

In another embodiment, in the method of dynamically routing I/O commands, a ranking of a path is increased based on a utilization rate of the path. Such an embodiment allows for increased system performance and efficiency by preventing paths from starving and not being used enough.

In another embodiment, in the method of dynamically routing I/O commands, the ranking is performed periodically. Such an embodiment allows for increased system efficiency by re-ranking paths only when required, saving computing recourses.

In another embodiment, in the method of dynamically routing I/O commands, the ranking is performed for each received I/O command. Such an embodiment allows for increased system performance by re-ranking paths for each I/O command to get the most up to date information.

In accordance with another aspect of the present disclosure, dynamically routing I/O commands may include a computing system including: a processor, memory, and an I/O controller for controlling I/O operations from the computing system, the I/O controller configured to: receive an input/output (I/O) command targeting a destination target, select, from a plurality of paths to the destination target, a path based on power consumption and a command response time associated with the path, and process the I/O command on the selected path. Such an embodiment allows for increased system performance and efficiency by selecting paths with lower power consumption and faster command response times.

In another embodiment, the I/O controller is also configured to track, for multiple I/O commands and at each of the multiple paths, the power consumption and the command response time. Such an embodiment allows for increased system performance by using historical data when selecting a path.

In another embodiment, the I/O controller is also configured to rank each of the multiple paths based on the tracked power consumption and the tracked command response time associated with each path. Such an embodiment allows for increased system performance and efficiency by selecting paths with lower power consumption and faster command response times.

In another embodiment, selecting the path includes selecting a highest ranked path. Such an embodiment allows for increased system performance and efficiency by selecting only the best paths when routing I/O traffic.

In another embodiment, a path of the multiple paths is not ranked if the command response time associated with the path is greater than a threshold. Such an embodiment allows for increased system performance by avoiding selecting a path that is too slow and may not meet SLA time requirements.

In another embodiment, a ranking of a path is increased based on a utilization rate of the path. Such an embodiment allows for increased system performance and efficiency by preventing paths from starving and not being used enough.

In another embodiment, the tracked power consumption and the tracked command response time associated with each path are weighted differently during the ranking of each of the multiple paths. Such an embodiment allows for increased user functionality by allowing for customization as to how the paths are ranked and which factors to prioritize.

In another embodiment, the weighting of the tracked power consumption and the weighting of the tracked command response time are each selectable by a user. Such an embodiment allows for increased user functionality by allowing users to customize how the paths are ranked and which factors to prioritize.

In accordance with another aspect of the present disclosure, dynamically routing I/O commands may include a computer program product including a computer readable storage medium and computer program instructions stored therein that, when executed, are configured to: receive an input/output (I/O) command targeting a destination target, select, from multiple paths to the destination target, a path based on power consumption and a command response time associated with the path, and process the I/O command on the selected path. Such an embodiment allows for increased system performance and efficiency by selecting paths with lower power consumption and faster command response times.

In another embodiment, the computer program instructions are further configured to track, for multiple I/O commands and at each of the multiple paths, the power consumption and the command response time. Such an embodiment allows for increased system performance by using historical data when selecting a path.

In another embodiment, the computer program instructions are further configured to rank each of the multiple paths based on the tracked power consumption and the tracked command response time associated with each path. Such an embodiment allows for increased system performance and efficiency by selecting paths with lower power consumption and faster command response times.

In another embodiment, selecting the path includes selecting a highest ranked path. Such an embodiment allows for increased system performance and efficiency by selecting only the best paths when routing I/O traffic.

Exemplary methods, systems, and products for dynamically routing I/O commands in accordance with the present disclosure are described with reference to the accompanying drawings, beginning with FIG. 1. FIG. 1 sets forth an example line drawing of a computing system configured for dynamically routing I/O commands in accordance with embodiments of the present disclosure. The example of FIG. 1 includes a computing system 100 coupled to a storage area network (SAN) 120, a storage device 122, and a storage device 125. The example SAN 120 is communicatively coupled to storage device 122 and to storage device 125.

The example computing system 100 of FIG. 1 includes a processor 102, random access memory (RAM) 104, and an input/output (I/O) controller 106. The example I/O controller 106 of FIG. 1 is configured to receive and process I/O commands or requests, such as handling traffic between the computing system and a destination target (such as another computing system, storage device 122, SAN 120, storage device 125, or any other type of storage location coupled to the system and configured to store data). For example, an I/O command targeting a storage device or server (such as SAN 120, storage device 122, or storage device 125 targeted through the SAN 120) is received by the I/O controller, which then processes the command using a communication pathway (or path) between the computing system and the destination target for the command.

In the example of FIG. 1, there are multiple communication pathways, or paths 110, coupling the computing system to each destination target (such as SAN 120, storage device 122, and storage device 125). In the example of FIG. 1, the computing system 100 is coupled to the storage device 122 via a path between the storage device 122 and port 108*a* and also via a path between the storage device 122 and port 108*b*. Similarly, the example of FIG. 1 also includes two paths 110 coupling the computing system to the SAN 120, with one path coupling the SAN 120 to port 108*c* and another path coupling the SAN 120 to port 108*d*. Further, the example of FIG. 1 includes two paths 110 coupling the computing system 100 (via port 108*c* and port 108*d*) to storage device 125 through the SAN 120. In such an embodiment, the computing system is configured to be coupled to a destination target that is not directly coupled to the paths 110 coupled to the computing system. Each port 108 (such as ports 108*a*-108*d* in FIG. 1) includes an adapter configured to send data from the computing system to a destination target. Some ports may utilize different types of adapters than others, and one or more of the adapters may consume different amounts of power when transferring data. In one embodiment, the ports (and their associated paths) coupling the computing system to a same destination target are configured to communicate with one another through the destination target.

The computing system 100 may include any number of paths between the computing system and a destination target (such as the SAN or storage device or computer system), and the paths are grouped by which destination the group of paths (or path groups) are coupled to. In one embodiment, the computing system may include four path groups (each coupled to one of four different destination targets), with each path group including eight paths. I/O traffic is typically routed from the system to the destination using a round robin approach that does not bias a single path over the others. However, such an approach ignores differences in response time and power consumption between the various available paths to a particular destination.

The I/O controller of FIG. 1 is configured to select which path to utilize when processing an I/O command at a destination based on both the power consumption, and the command response time, of the selected path. To select a path based on the power consumption and the command response time, the computing system 100 is configured to track the power consumption of each I/O command at each path and store a log of such information for reference when selecting a path for a newly received I/O command. The power consumed by a pathway for a given I/O command is based on how much power (and the rate of power) the adapter at that pathway's port consumes. The power of a given adapter may be substantially fixed and may slowly increase as the adapted ages. In addition to variances in power consumption coming from different types of adapters, adapters operating under different conditions (such as temperature, etc.) may consume power at different rates. The power consumed by each adapter may be known or may be measured and the data stored. Alternatively, if the power consumed cannot be measured, the power consumption may be predicted based on the type of adapter and the age of the adapter (and historical data).

The command response (CMR) time is the total amount of time it takes to respond to a request for service, and is the sum of the service time and wait time. The service time is the time it takes to do the work requested and the wait time is how long the request had to wait in a queue before being serviced. The command response time may also include transmission time if the request and the resulting response has to travel over a network. The command response time is a known value that can be tracked by a processor (or the I/O controller 106) for each I/O command. The computing system 100 is configured (such as by the I/O controller or any other processing device) to track the command response time of each I/O command, taking into account which path is being used for each command. Typically, as a path is used more frequently, the command response time will increase, as more traffic through a single path causes delays. By keeping track of recent data, the I/O controller may select a path based on updated command response times known for each available path. The tracking of the command response time and the power consumption at each port (and thus at each path) may be carried out continuously or periodically (where the period can be user selectable or can be automatically calculated by the system, such as based on known system statuses or operating conditions).

After tracking the command response time, and the power consumption, at each path, the computing system is configured to then rank each of the paths based on the tracked data. Specifically, the I/O controller (or any other processing device) is configured to rank each path based on one or more of command response time and power consumption. In one example, such a raking may be calculated using an inverse of the command response time (1/CMR time) multiplied by a ratio of the power consumed by a given path to the total amount of power consumed for the path group. The total amount of power consumed for a given path group is the sum of the power consumed by all of the adapters of each path within the path group. By ranking the paths based on an inverse of the CMR time, the ranking of a given path increases as the command response for that path decreases, thereby prioritizing paths with lower CMR times. By ranking the paths based on a power consumption ratio of paths to the path group, the ranking of a given path is increased for paths that consume a smaller amount of power relative to the other paths in the path group. The ranking of the paths may be carried out continuously (such as in response to each newly received I/O command) or may be carried out periodically (where the period can be user selectable or can be automatically calculated by the system, such as based on known system statuses or operating conditions).

In response to receiving an I/O command targeting a destination that utilizes multiple paths in a path group, the I/O controller is configured to select a path for processing the command based on the calculated rankings of the paths. In one example, the I/O controller selects the path with the highest ranking. Because of the formula used for calculating the paths, the rankings are self-correcting in that as the highest ranked path (which likely has a low CMR time) is selected over and over again, the CMR time for that path will start to decrease and thus lower its ranking until other paths are able to be selected. Similarly, if an adapter starts to fail and starts drawing more power, the ranking for the associated path will decrease and prevent further utilization for that path.

In order to not starve any one path within a path group, there may be a minimum threshold of usage required for each path. Such a threshold may be user selectable or may be automatically determined by the system. Accordingly, the rankings may be calculated based on such usage thresholds so that a path that has not yet reached its minimum usage threshold may be ranked as the highest ranked path. That is, the ranking of a path is increased based on the utilization rate of the path. In such an embodiment, the path may be ranked as the highest ranked path for a threshold amount of time or for a threshold number of I/O commands (where such thresholds are user selectable), until the path has reached its minimum usage threshold, before going back to the default ranking method or formula.

In some cases, where a path has an extremely low power consumption relative to the other paths in the path group, the highest ranked path may still have a particularly large CMR time. However, it is important for the I/O controller to not select a path that would be so slow as to not meet service level agreement (SLA) time requirements. Therefore, in order to reduce the likelihood of selecting a path that could be too slow, the ranking calculation may take into account the time requirements of various SLAs. For example, a path that has a CMR time greater than a threshold value (that may be user selectable or automatically determined based on known SLA time requirements) may receive a zero ranking or not receive a ranking at all. By not ranking (or ranking paths as zero) paths that do not meet SLA time requirements, the highest ranked path that will be selected for I/O command processing is guaranteed to meet SLA time requirements. Such a threshold value that determines whether a path is ranked or not may be set at a value consistent with the SLA time requirements, or the value may be set lower than such requirements dictate in order to add an additional buffer of safety when selecting paths.

Another way that a selected path may be too slow is if the actual CMR time differs from the tracked CMR time used in the ranking calculation. To counter such an error, and to reduce the likelihood of selecting a path that could be too slow, calculating the ranking may include adding a CMR time margin to the known tracked CMR time in the formula. By overestimating how long it will take for a path to carry out a command (and thereby lowering the ranking of the path), the I/O controller is less likely to select a path that is too slow to meet SLA time requirements.

The path rankings may be user customizable to prioritize different factors differently. For example, the tracked power consumption and the tracked command response time associated with each path may be weighted differently during the ranking of each path. That is, a multiplier (which may be in the form of a percentage, ratio, integer, and the like) may be selected for each factor (CMR time and power consumption) to weight the two factors when calculating the ranking of each path. In one embodiment, where a user assigns a multiplier of 4 to the power consumption factor but leaves the CMR time factor multiplier at default (which may be 1), the resultant path rankings will weight the power consumption as 4 times as important as the CMR time. By allowing a user to customize the weightings of each factor in the rankings, a user may prioritize either speed or power savings when routing I/O commands.

Figure 2:
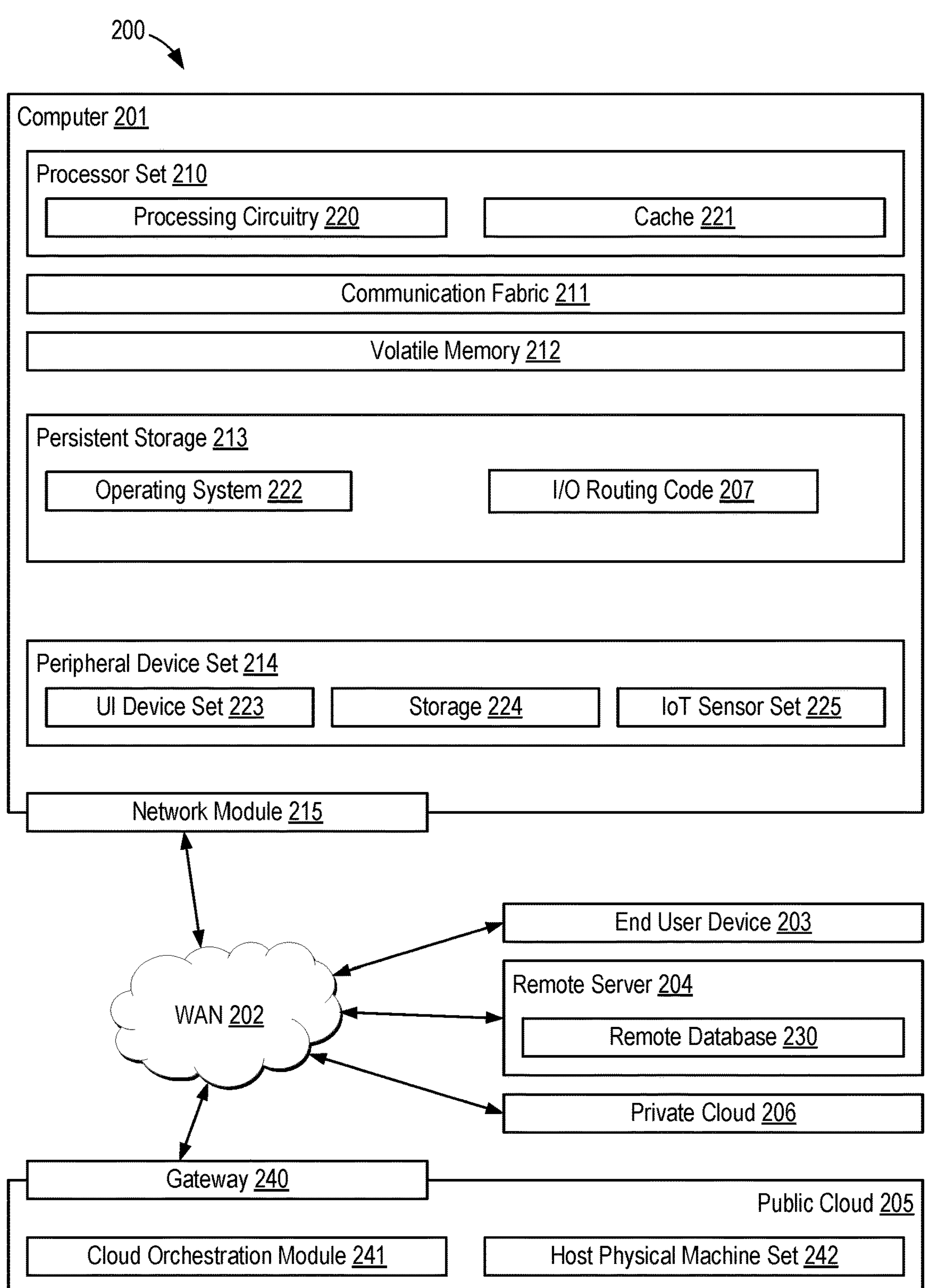
FIG. 2 is a block diagram of an example computing environment configured for dynamically routing I/O commands according to some embodiments of the present disclosure.

For further explanation, FIG. 2 sets forth a block diagram of computing environment 200 configured for dynamically routing I/O commands in accordance with embodiments of the present disclosure. Computing environment 200 contains an example of an environment for the execution of at least some of the computer code involved in performing the inventive methods, such as I/O routing code 207. In addition to I/O routing code 207, computing environment 200 includes, for example, computer 201, wide area network (WAN) 202, end user device (EUD) 203, remote server 204, public cloud 205, and private cloud 206. In this example embodiment, computer 201 is the management computing system 104 of FIG. 1, and includes processor set 210 (including processing circuitry 220 and cache 221), communication fabric 211, volatile memory 212, persistent storage 213 (including operating system 222 and I/O routing code 207, as identified above), peripheral device set 214 (including user interface (UI) device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in I/O routing code 207 in persistent storage 213.

Communication fabric 211 is the signal conduction path that allows the various components of computer 201 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface-type operating systems that employ a kernel. The code included in I/O routing code 207 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215. Network module 215 may be configured to communicate with other systems or devices, such as sensors 225, for receiving sensor measurements.

WAN 202 is any wide area network (for example, the internet) capable of communicating computer data over non-local distances by any technology for communicating computer data, now known or to be developed in the future. In some embodiments, the WAN 202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
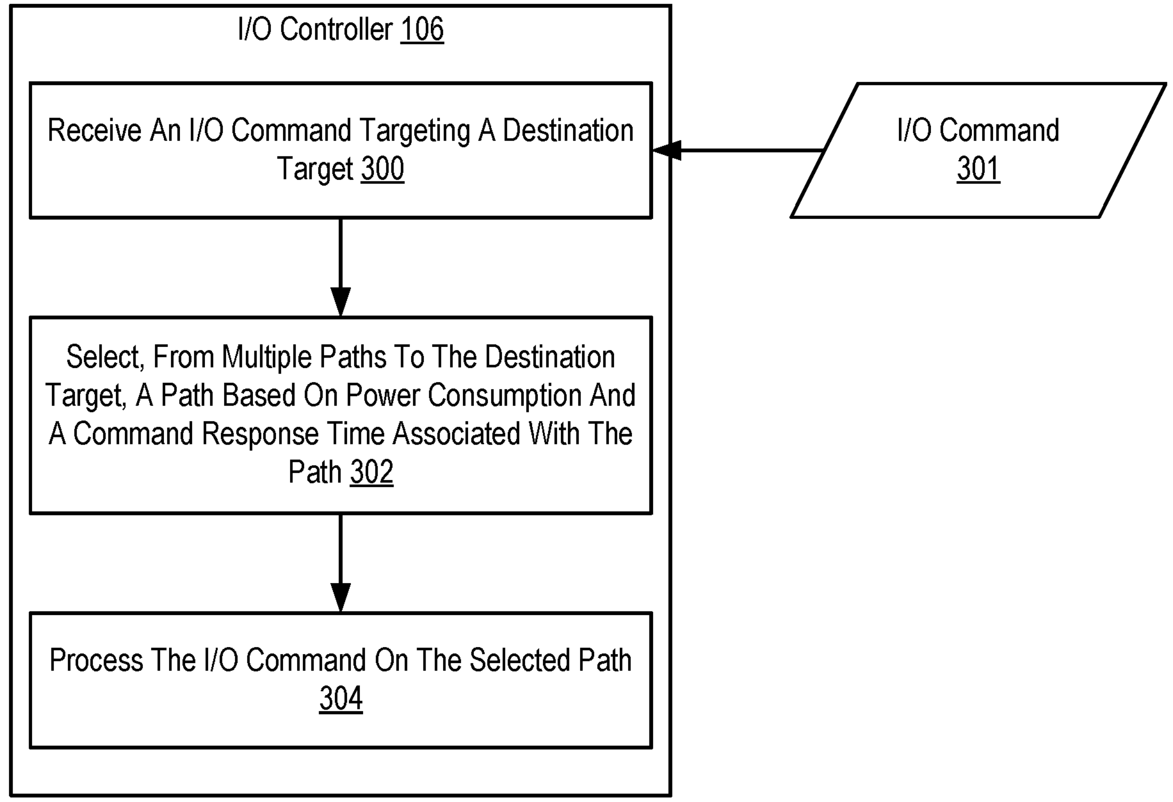
FIG. 3 is a flowchart of an example method for dynamically routing I/O commands according to some embodiments of the present disclosure.

For further explanation, FIG. 3 sets forth a flow chart illustrating an exemplary method of dynamically routing I/O commands according to embodiments of the present disclosure. The method of FIG. 3 includes receiving 300 an I/O command targeting a destination target. Receiving 300 an I/O command targeting a destination target may be carried out by the I/O controller receiving the I/O command 301, where the I/O command 301 specifies a targeted destination (such as a storage location or computing system). The destination target may be a storage area network, a storage device, or any other storage location configured to store data and be coupled to a system. The destination target may be any other computing system coupled to the computing system. The destination target may be coupled to the computing system (such as computing system 100 in FIG. 1) via multiple communication pathways (or paths).

The method of FIG. 3 also includes selecting 302, from multiple paths to the destination target, a path based on power consumption and a command response time associated with the path. Selecting 302 a path may be carried out by the I/O controller determining which group of paths (or path group) are coupled to the destination target specified in the I/O command, and then selecting a path from the group of paths. For example, an I/O controller, upon receiving an I/O command targeting a SAN (such as SAN 120), the I/O controller selects a path from the group of paths that couple the computing system to the SAN 120. Such selecting of a path is carried out by the I/O controller based on power consumption, and a command response time, associated with the path. In one embodiment, paths with a lower command response time or a lower power consumption are more likely to be selected.

The method of FIG. 3 also includes processing 304 the I/O command on the selected path. Processing 304 the I/O command on the selected path may be carried out by the I/O controller carrying out the I/O command at the destination target via the selected path. By selecting paths with lower command response time or lower power consumption, sustainability in the system may be optimized by limiting power consumption while maintaining high performance efficiency.

Figure 4:
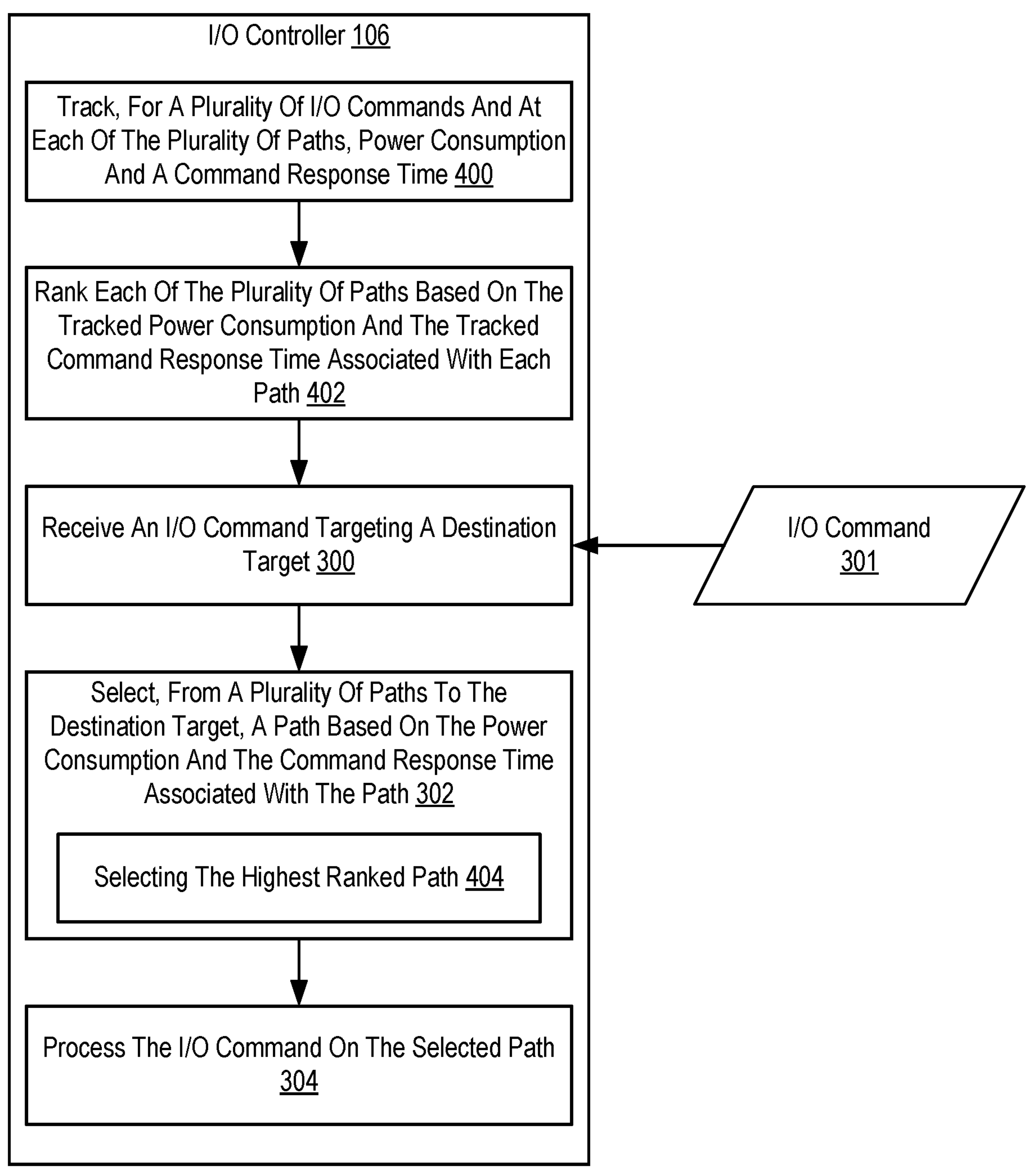
FIG. 4 is a flowchart of another example method for dynamically routing I/O commands according to some embodiments of the present disclosure.

For further explanation, FIG. 4 sets forth a flow chart illustrating another exemplary method of dynamically routing I/O commands according to embodiments of the present disclosure. The method of FIG. 4 differs from the method of FIG. 3 in that the method of FIG. 4 also includes tracking 400, for multiple I/O commands and at each of the multiple paths, power consumption and a command response time. The power consumed by a pathway for a given I/O command is based on how much power (and the rate of power) the adapter at that pathway's port consumes. The command response (CMR) time is the total amount of time it takes to respond to a request for service. The I/O controller 106 (or any other processing device) is configured to track the command response time of each I/O command, taking into account which path is being used for each command. As a path is used more frequently, the command response time will increase, as more traffic through a single path causes delays. By keeping track of recent data, the I/O controller may select a path based on updated command response times known for each available path. The tracking of the command response time and the power consumption at each port (and thus at each path) may be carried out continuously (by logging every I/O command) or periodically (such as over a specific amount of time, and in intervals). When tracking the data periodically, the I/O controller is configured to, periodically (where the period is user selectable) track the data for both factors (CMR time and power consumption) for a specified amount of time (which may be user selectable) and then averaging the tracked data for each factor. For example, the I/O controller may track the power consumption and CMR time and then store the results in a log in memory (local or remote to the I/O controller, or in system memory, or in RAM). Then, after waiting a specified amount of time, the I/O controller is configured to again track the data and update the numbers stored in the log with the most up to date information.

The method of FIG. 4 also includes ranking 402 each of the multiple paths based on the tracked power consumption and the tracked command response time associated with each path. Ranking 402 each of the multiple paths may be carried out by the I/O controller 106 based on a predetermined formula that is dependent on both the tracked power consumption and the tracked command response time associated with each path. In one example, such a predetermined formula may include multiplying the inverse of the command response time (1/CMR time) by a ratio of the power consumed by a given path to the total amount of power consumed for the path group. Ranking=(1/CMR time)*(power of path/total power of path group). The total amount of power consumed for a given path group is the sum of the power consumed by all of the adapters of each path within the path group. By ranking the paths based on an inverse of the CMR time, the ranking of a given path increases as the command response for that path decreases, thereby prioritizing paths with lower CMR times. By ranking the paths based on a power consumption ratio of paths to the path group, the ranking of a given path is increased for paths that consume a smaller amount of power relative to the other paths in the path group. The ranking of the paths may be carried out continuously (such as in response to each newly received I/O command) or may be carried out periodically (where the period can be user selectable or can be automatically calculated by the system, such as based on known system statuses or operating conditions). The rankings may be stored in a log or in memory (such as the memory where the tracked data is stored) and may be updated continuously or periodically (where the period is user selectable).

In order to not starve any one path within a path group, there may be a minimum threshold of usage required for each path. Such a threshold may be user selectable or may be automatically determined by the system. Accordingly, the predetermined formula for calculating the rankings may be based on such usage thresholds so that a path that has not yet reached its minimum usage threshold may be ranked as the highest ranked path. That is, the ranking of a path is increased based on the utilization rate of the path. In such an embodiment, the path may be ranked as the highest ranked path for a threshold amount of time or for a threshold number of I/O commands (where such thresholds are user selectable), until the path has reached its minimum usage threshold, before going back to the default ranking method or formula.

In some cases, where a path has an extremely low power consumption relative to the other paths in the path group, the highest ranked path may still have a particularly large CMR time. However, it is important for the I/O controller to not select a path that would be so slow as to not meet service level agreement (SLA) time requirements. Therefore, to reduce the likelihood of selecting a path that could be too slow, the ranking calculation may be based on the time requirements of various SLAs applicable to the I/O controller or its received I/O commands. For example, a path that has a CMR time greater than a threshold value may receive a ranking of 0 or may not receive a ranking at all. Not ranking paths that do not meet SLA time requirements ensures that the highest ranked path (which will be selected for I/O command processing) is guaranteed to meet SLA time requirements. Such a threshold value that determines whether a path is ranked may be set at a value consistent with the SLA time requirements, or the value may be set lower than the requirements to add an additional buffer of safety when selecting paths.

Another way that a selected path may be too slow is if the actual CMR time differs from the tracked CMR time used in the ranking calculation. To counter such an error, and to reduce the likelihood of selecting a path that could be too slow, calculating the ranking may include adding a CMR time margin to the known tracked CMR time in the formula. By overestimating how long it will take for a path to carry out a command (and thereby lowering the ranking of the path), the I/O controller is less likely to select a path that is too slow to meet SLA time requirements.

The path rankings may be user customizable to prioritize different factors differently. For example, the tracked power consumption and the tracked command response time associated with each path may be weighted differently during the ranking of each path. That is, a multiplier (which may be in the form of a percentage, ratio, integer, and the like) may be selected for each factor (CMR time and power consumption) to weight the two factors when calculating the ranking of each path. In one embodiment, where a user assigns a multiplier of 4 to the power consumption factor but leaves the CMR time factor multiplier at default (which may be 1), the resultant path rankings will weight the power consumption as 4 times as important as the CMR time. By allowing a user to customize the weightings of each factor in the rankings, a user may prioritize either speed or power savings when routing I/O commands.

The method of FIG. 4 also includes, as part of selecting 302 a path, selecting 404 the highest ranked path. Selecting 404 the highest ranked path may be carried out by the I/O controller identifying which path group is targeted by the I/O command (by checking which destination the command targets), identify each of the path rankings in the stored rankings within that path group, and selecting the path ranking which has the highest value. Because of the formula used for calculating the paths, the rankings are self-correcting in that as the highest ranked path (which likely has a low CMR time) is selected over and over again, the CMR time for that path will start to decrease and thus lower its ranking until other paths are able to be selected (such as when the path is no longer the highest ranked path). Similarly, if an adapter starts to fail and starts drawing more power, the ranking for the associated path will decrease and prevent further utilization for that failing path.

In view of the explanations set forth above, readers will recognize that the benefits of dynamically routing I/O commands according to embodiments of the present disclosure include:

- Increasing system efficiency by lower power consumption by selecting paths for IO traffic that have lower power consumption rates.
- Increasing system efficiency and performance by decreasing command response time for I/O commands by routing traffic using only the best paths.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method performed by an input/output (I/O) controller of a computing system, the method comprising:

receiving, by the I/O controller, an I/O input/output (I/O) command targeting a destination target;

selecting, by the I/O controller and from a plurality of paths to the destination target, a path based on power consumption and a command response time associated with the path, wherein the power consumption is based on an amount of power consumed by an adapter, of the computing system, associated with the path; and processing the I/O command on the selected path.

2. The method of claim 1, further comprising tracking, for a plurality of I/O commands and at each of the plurality of paths, the power consumption and the command response time.

3. The method of claim 2, further comprising ranking each of the plurality of paths based on the tracked power consumption and the tracked command response time associated with each path.

4. The method of claim 3, wherein selecting the path includes selecting a highest ranked path.

5. The method of claim 3, wherein a path of the plurality of paths is not ranked if the command response time associated with the path is greater than a threshold.

6. The method of claim 3, wherein a ranking of a path is increased based on a utilization rate of the path.

7. The method of claim 3, wherein the ranking is performed periodically.

8. The method of claim 3, wherein the ranking is performed for each received I/O command, wherein ranking each of the plurality of paths comprises:

dynamically adjusting a ranking of the path based on changes to the command response time associated with the path, wherein the changes are based on the path being selected for one or more I/O commands, and wherein selecting the path comprises:

selecting the path based on a threshold of usage.

9. A computing system comprising:

a processor;

memory; and an input/output (I/O) controller for controlling I/O operations from the computing system, the I/O controller configured to:

receive an I/O command targeting a destination target;

select, from a plurality of paths to the destination target, a path based on power consumption and a command response time associated with the path, wherein the power consumption is based on an amount of power consumed by an adapter, of the computing system, associated with the path; and process the I/O command on the selected path.

10. The computing system of claim 9, further comprising tracking, for a plurality of I/O commands and at each of the plurality of paths, the power consumption and the command response time.

11. The computing system of claim 10, further comprising ranking each of the plurality of paths based on the tracked power consumption and the tracked command response time associated with each path.

12. The computing system of claim 11, wherein selecting the path includes selecting a highest ranked path.

13. The computing system of claim 11, wherein a path of the plurality of paths is not ranked if the command response time associated with the path is greater than a threshold.

14. The computing system of claim 11, wherein a ranking of a path is increased based on a utilization rate of the path.

15. The computing system of claim 11, wherein the tracked power consumption and the tracked command response time associated with each path are weighted differently during the ranking of each of the plurality of paths.

16. The computing system of claim 15, wherein a weight of the tracked power consumption and weight of the tracked command response time are each selectable by a user.

17. A computer program product comprising a computer readable storage medium and computer program instructions stored therein that, when executed, are configured to:

receive an input/output (I/O) command targeting a destination target;

select, from a plurality of paths to the destination target, a path based on power consumption and a command response time associated with the path, wherein the power consumption is based on an amount of power consumed by an adapter, of a computing system, associated with the path; and process the I/O command on the selected path.

18. The computer program product of claim 17, further comprising tracking, for a plurality of I/O commands and at each of the plurality of paths, the power consumption and the command response time.

19. The computer program product of claim 18, further comprising ranking each of the plurality of paths based on the tracked power consumption and the tracked command response time associated with each path.

20. The computer program product of claim 19, wherein selecting the path includes selecting a highest ranked path.

* * * * *